United States Patent
Di Nicola et al.

(10) Patent No.: US 12,326,588 B2
(45) Date of Patent: Jun. 10, 2025

(54) POLARIZATION MANIPULATION OF FREE-SPACE ELECTROMAGNETIC RADIATION FIELDS

(71) Applicants: Lawrence Livermore National Security, LLC, Livermore, CA (US); University of Rochester, Rochester, NY (US)

(72) Inventors: Jean-Michel Di Nicola, Livermore, CA (US); Alvin Erlandson, Livermore, CA (US); Joseph A. Menapace, Livermore, CA (US); Gabriel Mennerat, Gif-sur-Yvette (FR); John Arthur Marozas, Rochester, NY (US)

(73) Assignees: Lawrence Livermore National Security, LLC, Livermore, CA (US); University of Rochester, Rochester, NY (US)

( * ) Notice: Subject to any disclaimer, the term of this patent is extended or adjusted under 35 U.S.C. 154(b) by 396 days.

(21) Appl. No.: 17/009,029

(22) Filed: Sep. 1, 2020

(65) Prior Publication Data

US 2021/0239893 A1  Aug. 5, 2021

Related U.S. Application Data

(60) Provisional application No. 62/967,774, filed on Jan. 30, 2020.

(51) Int. Cl.
*G02B 5/30* (2006.01)
*G01J 4/04* (2006.01)
*G02B 27/28* (2006.01)

(52) U.S. Cl.
CPC ............. *G02B 5/3083* (2013.01); *G01J 4/04* (2013.01); *G02B 27/286* (2013.01)

(58) Field of Classification Search
CPC ........ G02B 5/3083; G02B 27/286; G01J 4/04
See application file for complete search history.

(56) References Cited

U.S. PATENT DOCUMENTS 4,925,523 A * 5/1990 Braren ................. B23K 26/066
                                                        219/121.76
5,964,749 A * 10/1999 Eckhouse ............ A61B 18/203
                                                              606/9

(Continued)

FOREIGN PATENT DOCUMENTS

EP     0937999        8/1999
EP     1716457        12/2011

(Continued)

OTHER PUBLICATIONS

International Search Report in PCT/US2021/015016 dated Jul. 20, 2021 in 3 pages.

(Continued)

*Primary Examiner* — Michael P LaPage
(74) *Attorney, Agent, or Firm* — Knobbe, Martens, Olson ABear, LLP

(57) ABSTRACT

Technology is provided to transform spatially variable arbitrary polarization states and wavefront of a high-fluence, large-aperture laser beam to prescribed spatially resolved polarization states and wavefront at a specific position, with minimal losses. Technology is also provided to transform spatially resolved polarization states and wavefront at a specific position to spatially variable arbitrary polarization states and wavefront.

22 Claims, 5 Drawing Sheets

(56) References Cited

U.S. PATENT DOCUMENTS

| | | | |
|---|---|---|---|
| 6,252,712 B1 | 6/2001 | Fürter et al. | |
| 7,324,181 B2 | 1/2008 | Lazarev et al. | |
| 7,570,427 B2* | 8/2009 | Hasman | G02B 27/28 |
| | | | 359/566 |
| 8,427,769 B1 | 4/2013 | Stultz | |
| 11,016,230 B2* | 5/2021 | Saitoh | G02B 6/005 |
| 2003/0104318 A1* | 6/2003 | Allan | G03F 7/70958 |
| | | | 430/311 |
| 2004/0165269 A1* | 8/2004 | Hasman | G02B 5/1809 |
| | | | 359/566 |
| 2005/0195480 A1* | 9/2005 | Brown | G02B 21/0092 |
| | | | 359/489.07 |
| 2006/0126183 A1* | 6/2006 | Hasman | G02B 5/1809 |
| | | | 359/573 |
| 2007/0081114 A1* | 4/2007 | Fiolka | G03F 7/70566 |
| | | | 349/96 |
| 2007/0115551 A1* | 5/2007 | Spilman | G02B 27/286 |
| | | | 359/489.03 |
| 2007/0146676 A1 | 6/2007 | Tanitsu et al. | |
| 2007/0159694 A1* | 7/2007 | Brown | G02B 21/0016 |
| | | | 359/486.03 |
| 2007/0183017 A1 | 8/2007 | Hembt | |
| 2011/0255390 A1* | 10/2011 | Hirai | G11B 7/1353 |
| 2013/0027656 A1* | 1/2013 | Escuti | G02B 5/3083 |
| | | | 349/193 |
| 2013/0114140 A1* | 5/2013 | Auzas | G02B 5/3016 |
| | | | 359/489.07 |
| 2014/0139788 A1 | 5/2014 | Tatzel et al. | |
| 2014/0153097 A1* | 6/2014 | Beresna | G02B 27/286 |
| | | | 359/489.07 |
| 2014/0285878 A1 | 9/2014 | Escuti et al. | |
| 2014/0361152 A1 | 12/2014 | Maleev et al. | |
| 2016/0011353 A1* | 1/2016 | Escuti | G03B 21/2073 |
| | | | 359/15 |
| 2020/0150054 A1* | 5/2020 | Leong | G01N 21/21 |
| 2020/0185611 A1* | 6/2020 | Yi | H10K 85/115 |

FOREIGN PATENT DOCUMENTS

| | | | | |
|---|---|---|---|---|
| EP | 2605058 | | 6/2013 | |
| EP | 2705393 A1 * | | 3/2014 | B82Y 20/00 |
| KR | 10-2007-0003794 | | 1/2007 | |

OTHER PUBLICATIONS

Written Opinion in PCT/US2021/015016 dated Jul. 20, 2021 in 5 pages.

Schaefer et al., "Measuring the Stokes polarization parameters", Am J. Physics 75 (2), pp. 163-168, Feb. 2007.

Extended European Search Report received n EP Application No. EP 21747000 dated Jan. 26, 2024 in 8 pages.

* cited by examiner $$M_q(x,y) = \begin{bmatrix} 1 & 0 & 0 & 0 \\ 0 & \cos^2(2\theta_q) + \sin^2(2\theta_q)\cos\delta_q(x,y) & \cos(2\theta_q)\sin(2\theta_q) - \cos(2\theta_q)\cos\delta_q(x,y)\sin(2\theta_q) & \sin(2\theta_q)\sin\delta_q(x,y) \\ 0 & \cos(2\theta_q)\sin(2\theta_q) - \cos(2\theta_q)\sin(2\theta_q)\cos\delta_q(x,y) & \cos^2(2\theta_q)\cos\delta_q(x,y) + \sin^2(2\theta_q) & -\cos(2\theta_q)\sin\delta_q(x,y) \\ 0 & -\sin(2\theta_q)\sin\delta_q(x,y) & \cos(2\theta_q)\sin\delta_q(x,y) & \cos\delta_q(x,y) \end{bmatrix}$$

FIG. 3

POLARIZATION MANIPULATION OF FREE-SPACE ELECTROMAGNETIC RADIATION FIELDS

CROSS-REFERENCE TO RELATED APPLICATIONS

This application claims the benefit of U.S. Provisional Patent Application No. 62/967,774 titled "Polarization Manipulation of High-Fluence Fields," filed Jan. 30, 2020, incorporated herein by reference.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present technology relates to techniques offering a high degree of control for the transverse (x,y) distribution states of polarization (SOP) of a light beam in its transverse dimension, and more specifically, it relates to technology for (1) depolarization compensation or (2) arbitrary polarization shaping and generation that is applicable over large ranges a of beam aperture size, operating fluence and repetition rate. Moreover, the technique described hereafter does not introduce any significant losses in the beam path.

Description of Related Art

Heat dissipation is an issue for depolarization compensation in solid-state laser design and high repetition rate applications. Usually, solid-state lasing media have poor-to-mediocre thermal conductivity. Laser systems that are operated at high rep-rate suffer from excessive heat accumulation in the gain medium unless they are actively cooled Heating and cooling processes generate stresses and temperatures gradients in the gain medium resulting in modifications of the local properties of the material. A material initially isotropic tends to become anisotropic and exhibit birefringent properties. A linearly polarized beam to be amplified experiences amplification but also polarization changes. Because optical components downstream can exhibit varying responses to polarization, the light oriented along the undesired polarization will likely be reduced, lost or even worse, create damage in the laser system. FIG. 1 illustrates an input electromagnetic radiation field 10 having a states of polarization that are different across (x,y) at plane 12 after traversing a birefringent distortion (not shown in the diagram) followed by a polarizer 14 and an output fluence map 16 of the output field 18. Polarizer 14 will exhibit a different response to the various polarizations represented by the SOP of plane 12, producing, e.g., the exemplary fluence map/depolarization (x,y) and reduced energy at plane 16.

A state-of-the-art method for managing heat dissipation, wavefront distortion and thermally induced birefringence in solid-state amplifiers is the use of thin-slabs of amplifiers that are cooled with high velocity gases, sometimes using cryogenic systems. Wavefront distortion and thermal birefringence are minimized since the temperature gradients in such slabs are aligned predominantly in the direction normal to the slab surfaces and parallel to the beam propagation direction. In some cases, temperature gradients and corresponding wavefront distortion and birefringence are reduced further by invoking cryogenic systems, which can cause increased thermal conductivity by decreasing slab temperature. After these methods have been invoked, the remaining birefringence and depolarization can be reduced by using birefringence compensation methods based on 90-degree polarization rotation between passes through a single amplifier, or on 90-degree polarization rotation between passes through like amplifiers that have matching temperature gradients and birefringence. The 90-degree polarization rotation can be achieved in several ways. For example, in one method, the rotation is achieved by double-passing a 45-degree faraday rotator (FR) and amplifier that are arranged in tandem. This gives the best possible compensation since the thermal gradients and birefringence for pass 1 through the amplifier are matched perfectly with the thermal gradients and birefringence for pass 2 through the amplifier. In another example, the rotation is achieved by using a Faraday rotator or active quartz rotator to rotate the polarization by 90 degrees between two like amplifier. In practice, this method gives a less accurate compensation than the first method because it is difficult to match the pump distributions, temperature gradients and birefringence of the two like amplifiers. Additionally, compensation with FRs is negatively affected by parasitic heating, temperature gradients and birefringence in the FR material itself, particularly at high rep-rate. In a third example, rotation is achieved by using a spatially uniform quarter-wave plate to rotate the polarization between two like amplifiers. This third method provides only partial compensation and works well only when the beam incident on the waveplate remains highly polarized, i.e., when the birefringence and depolarization of each amplifier is small. This limitation arises because single waveplates are generally homogeneous in space and fail to compensate a beam with different polarization states across the beam aperture (x,y). In a fourth example, the rotation is achieved using programmable liquid crystals to generate beams with arbitrary polarization and to compensate for depolarization, but their useful aperture is fairly limited, and they generally operate at a low fluence (e.g., <100 mJ/cm$^2$) due to the damage in the layers for transparent electrodes.

Although compensation with single waveplates tends to be poor, waveplates in general have several advantages relative to FRs. Specifically, they are simpler, tend to be less expensive and scale to larger apertures more readily since they do not require a uniform magnetic field to affect the polarization rotation. The high magnetic fields associated with FRs pose special handling and operational and safety issues. Waveplates also have a significant advantage over programmable liquid crystals devices in that they have higher damage thresholds and can be operated safely at higher fluences, at up to several 10s of J/cm$^2$.

It is desirable to achieve birefringence compensation that is comparable in quality to the birefringence compensation that can be achieved with FRs, but without the negative consequences or limitations of using FRs (magnetic fields, limited aperture) or programmable liquid crystal arrays (low damage thresholds). It is also important to note that FR can only be used for birefringence compensation techniques and do not have the flexibility to tailor the local polarization with arbitrary polarization states like the present technology does.

SUMMARY

The present technology manipulates the local polarization across the aperture of a laser beam, including high fluence laser beams. This approach makes it possible to manipulate the polarization locally in space (x,y) of an incident laser field and generate an arbitrary desired polarization. The technology generally uses a sandwich or placement of one or any integer number of birefringent plates that have specially manufactured thicknesses varying across the aperture. While the generation of some special states of polarization will require only one birefringent element, the polarization compensation of any arbitrary depolarizing element will require at least two birefringent elements, as discussed infra. The varying thicknesses can be obtained by the magneto-rheological finishing (MRF) technique or an ultra-precise manufacturing technique. The accuracy over the state of polarization control provided by the present technology is much greater than provided by conventional technology. The present technology allows control of material removal at a few nanometers, e.g., at 5 nm RMS. This is 10,000 times more accurate than a typical human hair diameter (>50 microns) given the uncertainty on Stokes vector state of polarization of <0.02 degree. This is well below the detection noise of commercially available instruments.

The technology can not only be applied to correct a depolarized beam but also to generate a beam with a non-spatially-uniform polarization state, e.g., like radially or azimuthally polarized beams, starting from a purely linearly polarized beam. It can also be used as a birefringence corrector by taking a beam with spatially dependent polarization and transforming it into a beam with linear polarization across the whole aperture. These uses are exemplary only. Those skilled in the art will understand other uses based on the present disclosure. The application would be particularly useful to combat depolarization due to heat extraction in high-average power, solid-state lasers. Further uses include ameliorating birefringence and polarization losses that are the main limiting factor to higher repetition rate operations. Thus, exemplary uses can be found in polarization manipulation in high-average power solid-state lasers and solid-sate laser depolarization compensation generation of spatially resolved arbitrary states of polarization that are in demand for many scientific or industrial applications.

BRIEF DESCRIPTION OF THE DRAWINGS

The accompanying drawings, which are incorporated into and form a part of the disclosure, illustrate embodiments of the technology and, together with the description, explain the principles of the technology.

FIG. 3 shows a Mueller matrix for a retardation waveplate.

DETAILED DESCRIPTION

The present technology relies on a sandwich of one-to-n (an integer number) birefringent plates with the eigen-axis of each plate at an optimized orientation and that can be carved, e.g., by magnetorheological finishing techniques such their respective thickness varies as function of position on the transverse plane, i.e., e(x,y). The number of plates, n, depends on the application. A choice material is quartz because of its availability in sizeable apertures, its cost and its potentially large birefringence (difference between ordinary and extraordinary index of refraction); however, other birefringent material, often depending on the applied MRF technique, can be used depending on the application and other technological trade-offs.

Each plate is formed to have a special thickness at each point (x,y) and thereby act as a local polarization transformer element by locally varying the optical retardation between the two neutral axes. As each plate is made of a monolithic piece of birefringent material, the eigen-axis orientation is the same across (x,y). Because of this constraint, multiple birefringent elements are utilized to undo or reduce the polarization distortion across an input beam having a plurality of SOP.

Figure 1:
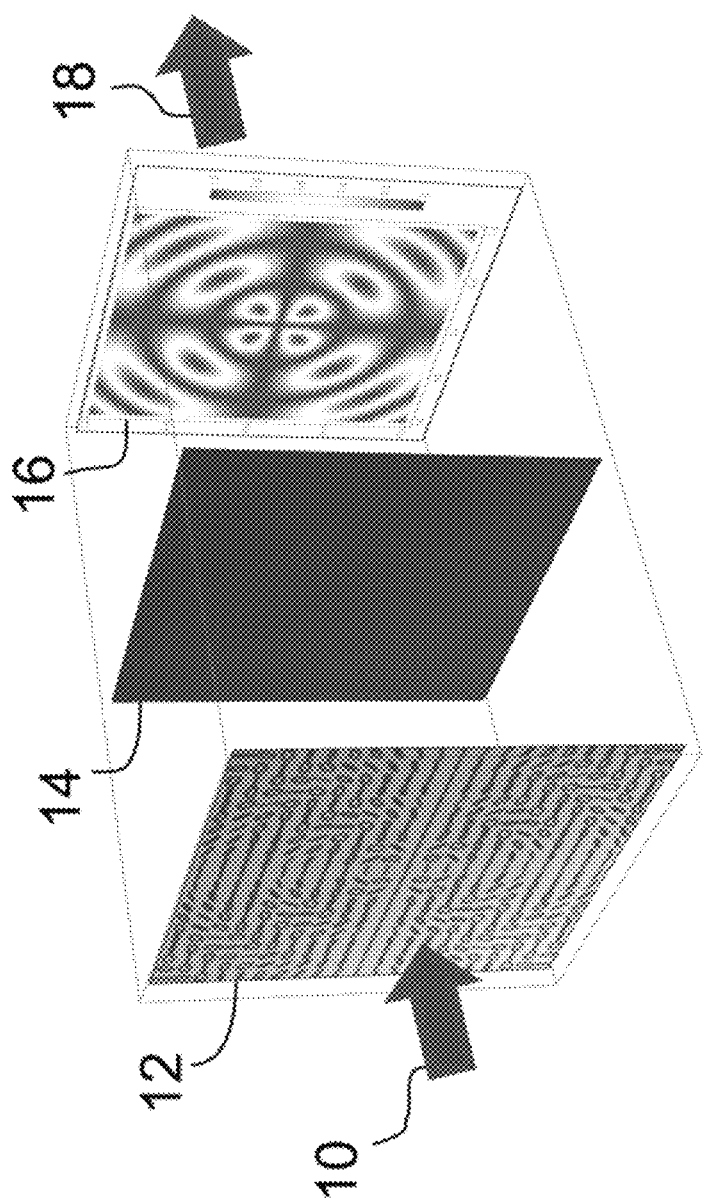
FIG. 1 illustrates an input field having a plurality of states of polarization across an x,y, plane after birefringent distortion, followed by a polarizer and an output fluence map.
Figure 2A:
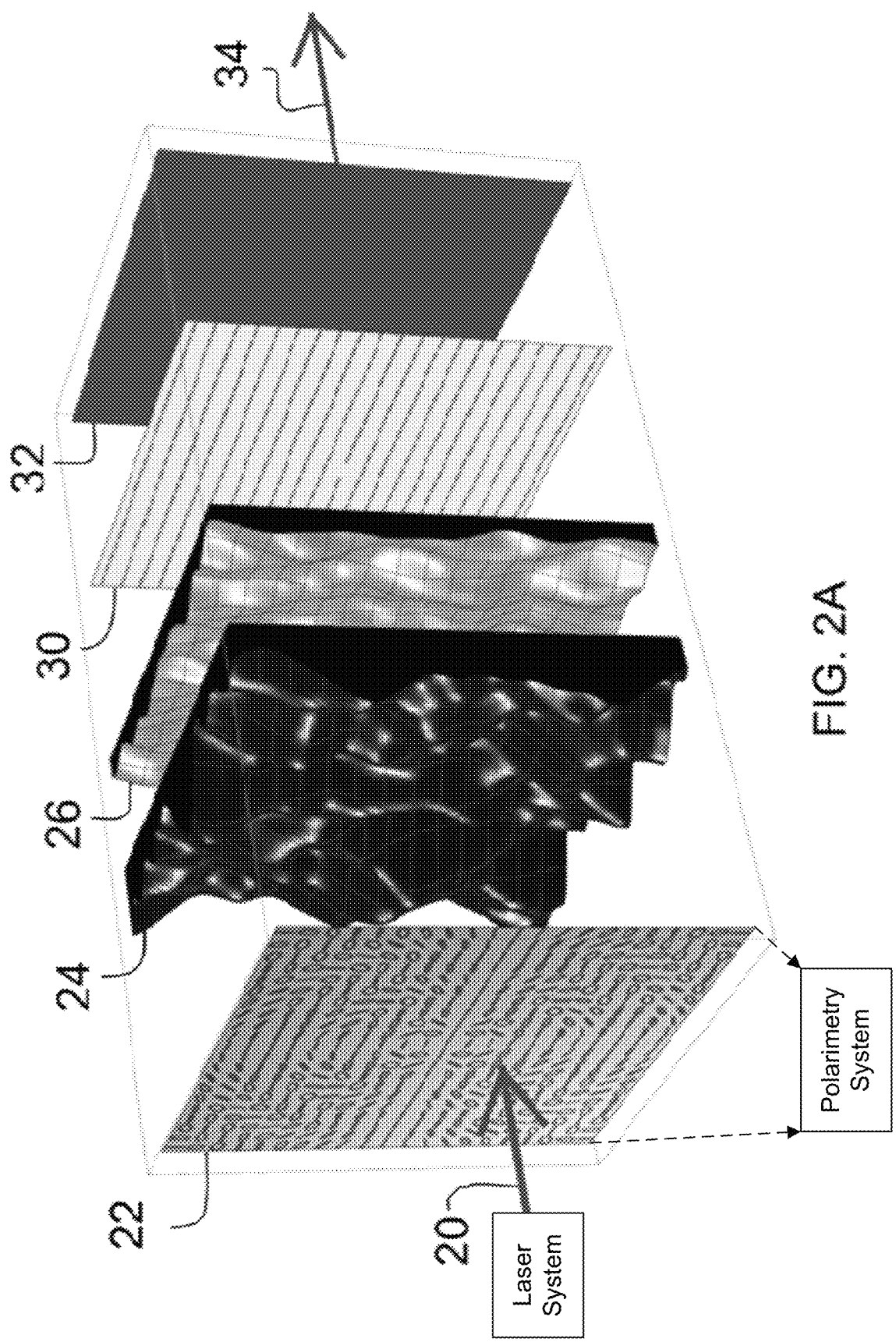
FIG. 2A illustrates an input field having a plurality of states of polarization across an x,y of plane after birefringent distortion, followed by two magnetorheological finished (MRF) corrector plates and shows the SOP at an output plane.

FIG. 2A illustrates an input field 20 having states of polarization across an (x,y) of plane 22 after birefringent distortion, followed by two MRF corrector plates 24 and 26 and shows the SOP at an output plane 30, where the polarization is aligned along the same axis (horizontal in this case). In an ideal case, the output fluence map 32 of field 34 is uniform, having no depolarization.

Figure 2B:
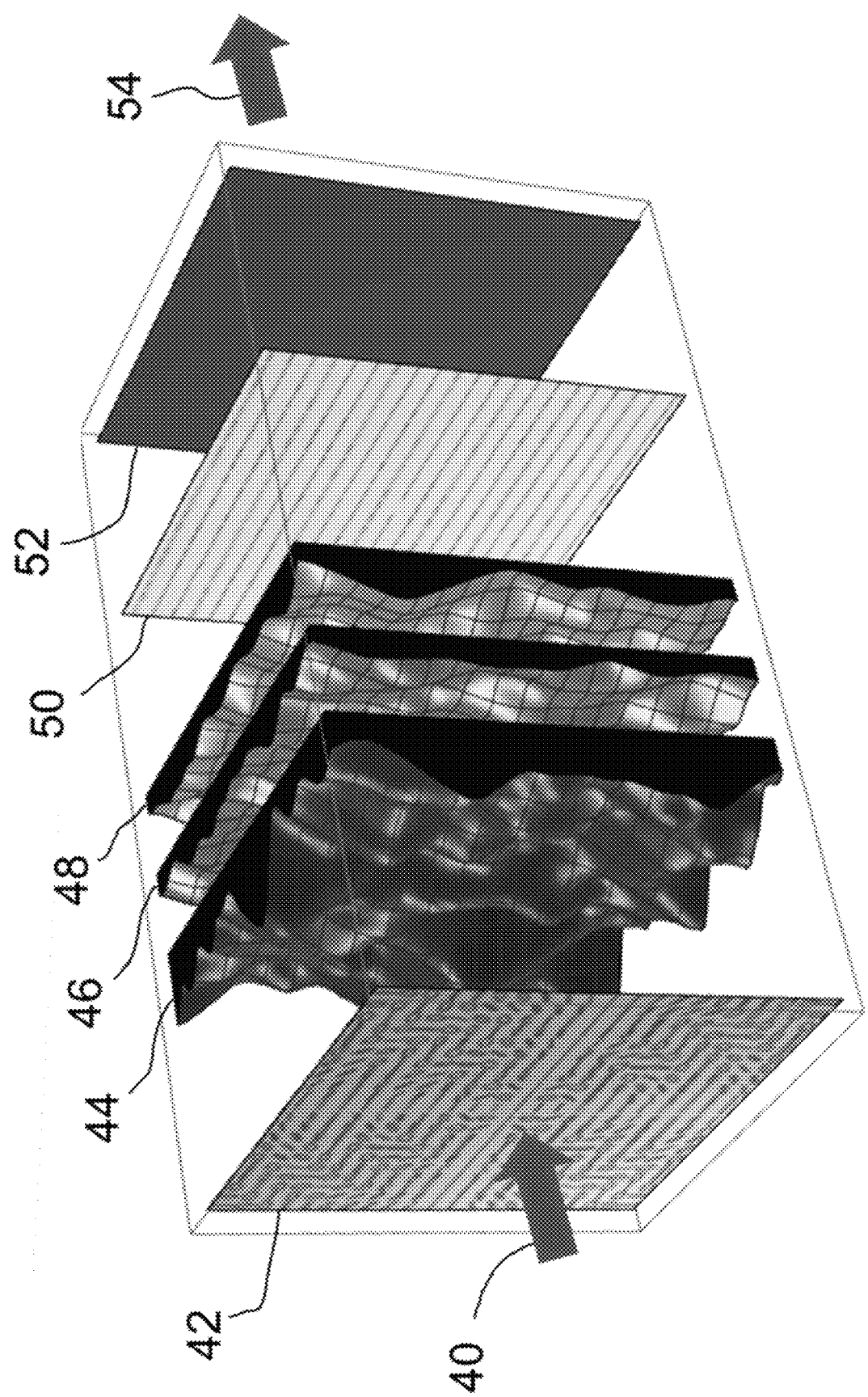
FIG. 2B illustrates an input field having a plurality of states of polarization across an x,y plane after birefringent distortion, followed by three (or more) MRF corrector plates and shows the SOP at an output plane.

FIG. 2B illustrates an input field 40 having a state of polarization (SOP) variable in (x,y) at the plane 42 after birefringent distortion, followed by three (or more) MRF corrector plates 44, 46, and 48 (which can represent one or more corrector plates) and shows the SOP at an output plane 50, wherein the polarization is aligned along an axis. In an ideal case, the output fluence map 52 of field 54 is uniform, having no depolarization.

Thus generally, the technology transforms spatially variable arbitrary polarization states and wavefront of a high-fluence laser beam to prescribed spatially resolved polarization states at specific transverse wavefront positions, with minimal losses. The technology can be used in an inverse manner to convert a uniformly polarized input field into an output field having prescribed spatially variable arbitrary polarization states. This latter configuration can be achieved, in some cases, with a single MRF corrector plate.

Measurement and Definition of Input Beam Parameters

The polarization state of polarized optical waves may be represented, e.g., in the Mueller formalism or in the Jones formalism. The Mueller formalism makes use of Stokes vectors, which are real vectors that can be directly measured. The Jones formalism is based on complex values and is better suited to numerical beam propagation. Those skilled in the art will understand that the polarization state of polarized optical waves may be represented by other methods as well.

Acquisition of spatially resolved polarization parameters relies on usual polarimetry methods, such as the rotating quarter-waveplate method, using an image acquisition system as a light amplitude detector. See, e.g., "Measuring the Stokes polarization parameters", Am J. Physics 75 (2) 2007, incorporated herein by reference. The image acquisition system can be one or more area scan- or line scan-digital CCD or CMOS cameras, or analog cameras, e.g., associated to interface cards and software. Other means will be understood by those skilled in the art based on the teachings herein. The parameters include four two-dimensional arrays of real values $S_0(x,y)$, $S_1(x,y)$, $S_2(x,y)$ and $S_3(x,y)$ defining the Stokes parameters for each pixel at (x,y) coordinates in the transverse plane. The SOP is usually represented as a point of coordinates (S1/S0, S2/S0, S3/S0) on the Poincaré sphere. These coordinates are normalized with respect to S0 as this parameter is constant for a lossless medium. For sake of simplicity, they are referred to hereafter as (S1, S2, S3).

The quantity $p(x,y)=\sqrt{(S_1)^2+(S_2)^2+(S_3)^2}/S_0$ indicates the degree of polarization of the light. The device under consideration will only affect the fraction p of the light intensity that is perfectly polarized.

The wavefront of the beam is measured at the same position with a suitable wavefront sensor like a Hartman-Shack system or a quadrilateral shearing interferometer. A fiducial may be inserted into the beam path to facilitate the matching in space (magnification, orientation and position) of fluence, wavefront and spatially resolved polarimetric measurements.

Whenever possible it is preferable to measure the input beam parameters directly at the position where the device is to be inserted, by imaging this plane on the image sensors. When this imaging is not possible, the light wave should be numerically propagated using vectorial coherent beam propagation techniques and software such as VBL++ or Miro to provide the beam polarimetric 2D mapping, fluence and wavefront at the input of the device. Measured Stokes parameters are first converted to spatially resolved Jones vectors $J_{max}(x,y)$ for the numerical propagation.

$$J_{mes}(x, y) = \begin{bmatrix} A_{x,mes}(x, y)\exp\left(-i\frac{\phi_{mes}(x, y)}{2}\right) \\ A_{y,mes}(x, y)\exp\left(+i\frac{\phi_{mes}(x, y)}{2}\right) \end{bmatrix}$$

Following this numerical propagation step, Jones vectors are converted back to give the Stokes parameters $S_{0,in}(x,y)$, $S_{1,in}(x,y)$, $S_{2,in}(x,y)$ and $S_{3,in}(x,y)$ at the input of the device as follows:

$S_{0,in}(x,y)=A_{x,in}^2(x,y)+A_{y,in}^2(x,y)$ $S_{1,in}(x,y)=A_{x,in}^2(x,y)-A_{y,in}^2(x,y)$ $S_{2,in}(x,y)=2A_{x,in}(x,y)A_{y,in}(x,y)\cos \phi_{in}(x,y)$ $S_{3,in}(x,y)=2A_{x,in}(x,y)A_{y,in}(x,y)\cos \phi_{in}(x,y)$ where $A_{x,in}^2(x,y)+A_{y,in}^2(x,y)=1$.

Definition of the Prescribed Output Beam Parameters

The spatially resolved polarization parameters and wavefront may be prescribed in the near field at the immediate vicinity of the device, or in the far field, or any intermediate field. Numerical vectorial beam back-propagation techniques similar to the techniques above are to be used to obtain the desired wavefront $\varphi_{out}(x,y)$ and spatially resolved Stokes polarization parameters:

$S_{0,out}(x,y), S_{1,out}(x,y), S_{2,out}(x,y)$, and $S_{3,out}(x,y)$.

Description of Exemplary Device

The device consists of a stack of one, two, three or more static birefringent waveplates exhibiting a shallow thickness modulation to provide the desired polarization transformation. The stack is usually inserted at a position where the beam is collimated but would also work with converging or diverging beams. In the latter cases, beam geometrical downsizing or expansion between each plate should be taken into account.

Waveplates are most desirably positioned as close as possible to each other but can be positioned at some distance apart. For large distances, diffraction effects may in some cases need to be included in the calculations, requiring back and forth transformations between Stokes and Jones formalism to use numerical beam propagation algorithms.

To convert an arbitrary SOP on the Poincaré Sphere into a horizontal linear state, two plates would be sufficient for the required polarization transformation. However, more waveplates may be useful to generate arbitrary SOP starting from a linear polarization or distribute the surface modulation over a larger number of plates, or to provide for enhanced temperature or wavelength tolerances.

The waveplates need not be made of the same material. Using different materials may be of interest to provide a broad spectral range of operation in a so-called achromatic configuration, or larger temperature tolerances. These waveplates can be carved in a single side, or on both sides.

Birefringent waveplates are typically made of highly transparent uniaxial (or biaxial) optical crystals such as, but not limited to, crystalline quartz ($\alpha$-SiO$_2$), magnesium fluoride (MgF$_2$), calcite (CaCO$_3$), $\alpha$-barium borate ($\alpha$-BBO), yttrium vanadate (YVO$_4$), sapphire (Al$_2$O$_3$), mica, cadmium thiogallate (CdGa$_2$S$_4$), cadmium sulfide (CdS), cadmium selenide (CdSe), Potassium Dihydrogen Phosphate (KDP), Potassium di-deuterium phosphate (DKDP) or birefringent polymers. The thickness modulation is practically realized through the magneto rheological finishing technique. These waveplates can be anti-reflection coated if desired.

For minimum thickness modulation, the beam should propagate along a direction normal to the optical axis, providing maximum retardation. Optically biaxial materials may be used as well, offering additional flexibility to tune wavelength or temperature tolerances. Propagation along the Y principal optical axis would yield maximum retardation in such materials.

The stack should in general be made of waveplates with different optical axis orientations with regard to the horizontal. The angles $\theta_1$ with regard to the horizontal plane can be chosen to minimize the spatial gradients of the thickness modulation, thereby easing the fabrication process and minimizing diffraction effects.

In most cases, the original thickness of each of these parallel waveplates is chosen for neutral retardation, i.e., such that the total retardation prior to applying the modulation is an integer multiple of $2\pi$. Other thicknesses can be used, providing other average polarization transformation. Functional half-waveplate or quarter-waveplates can be included in the stack. Formulae below would need to be modified accordingly.

If $n_0$ and $n_e$ are the principal ordinary and extraordinary refractive indices at the design wavelength $\lambda$ and temperature, the thicknesses e(k) corresponding to a neutral waveplate of order k is given by:

$$e(k) = \frac{k\lambda}{|n_e - n_o|}$$

At a wavelength $\lambda$=1053 nm, room temperature refractive indices in crystalline quartz are $n_0$=1.53425; $n_e$=1.54299. A dephasing of $2\pi$ corresponds to a thickness e(1)≈120 μm. In practice, choosing an order k=30 for instance, yields a practical thickness of e(30)=30e(1)≈3.6 mm, facilitating manipulation.

Calculation of the Phase-Differences

The output Stokes vectors are related to the input Stokes vector through the following formula:

$$S^{out}(x,y) = M_p(x,y) M_{p-1}(x,y) \ldots M_2(x,y) M_1(x,y) S^{in}(x,y)$$

where the Mueller matrix for the retardation waveplate q is defined in the matrix shown in FIG. 3. Here $\delta_q(x,y)$ is the spatially-dependent phase difference between the fast and the slow axis, and $\theta_q$ is the angle between the optical axis of waveplate q and the horizontal plane.

The result is a system of three non-linear equations at each point (x,y) with p unknowns, namely the phase-differences $\delta_q(x,y)$ that need to be solved at each point, with the angles $\theta_1, \ldots, \theta_p$ as parameters. Depending on the parameters $\theta_1, \ldots, \theta_p$, the system may or may-not exhibit solutions at all or some particular points (x,y). The following exemplary method is provided in order to find acceptable solutions.

Exemplary Method

In this example, one tries to compensate SOP that are different across the beam aperture (e.g., field 22 of FIG. 2A). Each point (x,y) of the beam aperture representing a different state of polarization will be mapped at a specific location of the Poincaré sphere. To remove this "spatial scrambling" of the polarization, the goal is to collapse all these points onto a single, arbitrary point at the surface of the sphere. That way, all the points in space (x,y) will share the same state of polarization. In this exemplary method, the linear, horizontal (with respect of an arbitrary reference frame defined in the laboratory) polarization has been chosen, without loss of generality. If a different, but still spatially uniform SOP is more desirable (like circular polarization), one could use commercially available components (uniform across their aperture) that could transform a horizontal linear (homogeneous in space) polarization into a circular one. In order to match an arbitrary rotation in space of a rigid body or a mobile reference frame, three rotations in 3D space are needed. Among the possible choices is the set of the Euler angles with the precession, nutation and intrinsic rotations/angles.

Figure 4:
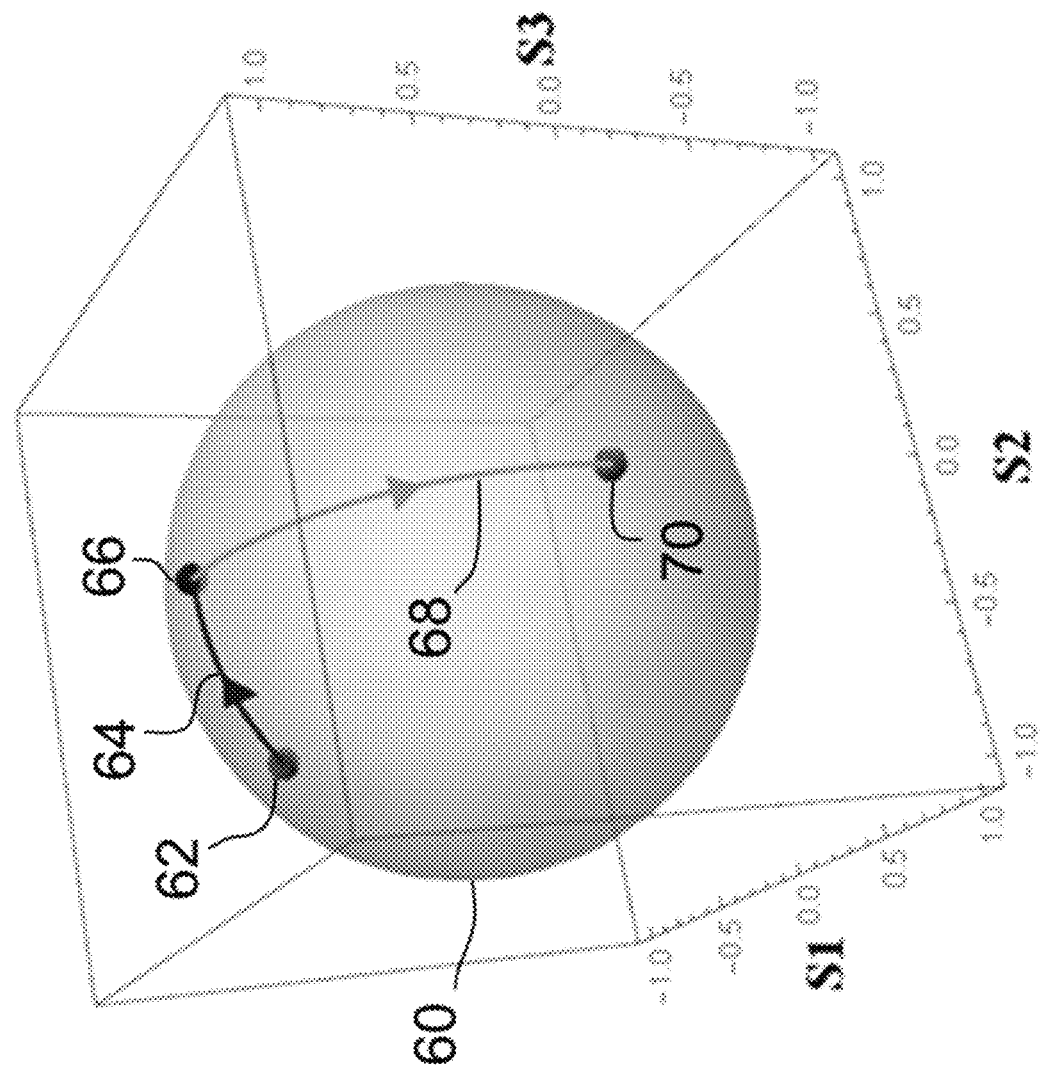
FIG. 4 shows polarization mapped on the Poincaré sphere.

In the case of the SOP, a point on the Poincaré sphere, only two rotations/angles are needed (as the intrinsic rotation is useless), like the longitude and latitude, to go from an arbitrary point (S1=0.077, S2=0.58, S3=0.81) (e.g., point 62 on Poincaré sphere 60 shown in FIG. 4) to the linear horizontal polarized (S1=1, S2=0, S3=0) location (e.g., point 70 shown on FIG. 4). The choice of the two axes of rotation is critical. For example, if they are chosen to be the same, the composition of two rotations degenerates into a single rotation around the same axis with the final angle being the sum of the two individual angles and only a circle along the Poincaré sphere is accessible. In the above example, the first waveplate axis is oriented with its neutral axis at $\theta_1=0$ (relative to the x-axis of the reference frame defined in the laboratory). When the retardation (thickness) of this plate is varied, the point representing the initial state of polarization on the Poincaré sphere will describe a circle as the intersection of the sphere and a plane comprising the initial point and normal to the axis S1. Varying the thickness and therefore the retardation of the plate 1, produces a 3D rotation around the S1 axis. By selecting the desired thickness, it is therefore possible to nullify the value of S2 by using this first rotation to send the initial point 62 through arc 64 to point 66 on the Poincaré sphere. Subsequently, a second waveplate is placed with its neutral axis oriented at $\theta_2=\pi/4$ (relative to the x-axis of the reference frame defined in the laboratory). Varying the thickness of the second plate equates to rotation of the SOP state around the S2 axis. This time, the thickness of plate 2 is used to nullify S3 as shown in the plot below and going from point 66 through arc 68 to point 70 as the chosen final SOP, a horizontal, linearly polarized state (S1=1, S2=0, S3=0).

Using Quaternion calculus, the general equations were derived and simplified by substituting $\theta_1$ to 0 and $\theta_2$ to $\pi/4$ (see set of three equations below). The solution is not unique to travel from point A to point B on a sphere and many more combinations involving (a) more plates and (b) different neutral axis orientations $\theta_i$ are possible. Each plate adds the ability to travel along an additional arc, oriented as a function of its neutral axis and an arc-length related to the retardation. More plates offer more degrees of freedom and additional flexibility to make the fabrication of the plates easier and to tune wavelength or temperature tolerances; however, the present technology has demonstrated that two plates are sufficient. Conversely, if one starts with a horizontal linear polarization, then by light back-tracing principles, the combination of the two plates described above, traversing the second plate first and the first plate last, allows the generation of an arbitrary SOP for each (x,y) points. This technique, in conjunction with the magneto-rheological finishing (MRF) technique or an ultra-precise manufacturing technique, enables the manufacture of a device that will generate any possible beam with spatially variant SOP to a high degree of accuracy.

Referring to FIG. 4, the initial arbitrary SOP 62 is described by:

$$\begin{pmatrix} S_1 \\ S_2 \\ S_3 \end{pmatrix}_{Initial} = \begin{pmatrix} \cos[2\chi]\cos[2\psi] \\ \cos[2\chi]\sin[2\psi] \\ \sin[2\chi] \end{pmatrix}$$

After traveling from SOP 62 on the Poincaré Sphere 60 through arc 64 to point 66 and then through arc 68 to the final SOP at point 70, final point 70 can be expressed as:

$$\begin{pmatrix} S_1 \\ S_2 \\ S_3 \end{pmatrix}_{Final} = \begin{pmatrix} \cos[\delta 1]\sin[\delta 2]\sin[2\chi] + \cos[2\chi](\cos[\delta 2]\cos[2\psi] + \sin[\delta 1]\sin[\delta 2]\sin[2\psi]) & (eq.\ 1) \\ -\sin[\delta 1]\sin[2\chi] + \cos[\delta 1]\cos[2\chi]\sin[2\psi] & (eq.\ 2) \\ \cos[\delta 1]\cos[\delta 2]\sin[2\chi] + \cos[2\chi](\cos[\delta 2]\sin[\delta 1]\sin[2\psi] - \cos[2\psi]\sin[\delta 2]) & (eq.\ 3) \end{pmatrix}$$

with the plates respectively oriented at $\theta_1=0$ with retardance $\delta_1$ and $\theta_2=\pi/4$ with retardance $\delta_2$.

From this set of 3 equations, it is easy to nullify S2 (as geometrically described above) using equation (2) that only involves the free variable $\delta_1$ representing the first plate retardation and thickness. Then, the equation (3) can be used to nullify S3 with the second plate and therefore determine its retardation/thickness. It is desired, in this example, to achieve a horizontal polarization as the final state.

Calculation of the Physical Modulation Depths to be Carved in the Birefringent Plates Once the retardances or phase-differences $\delta_q(x,y)$ are calculated for each plate, the depth $\Delta z_q(x,y)$ for carving the $q^{th}$ waveplate is given by:

$$\Delta z_q(x, y) = \frac{\lambda \delta_q(x, y)}{2\pi |n_{e,q} - n_{o,q}|}$$

where $n_{e,q}$ and $n_{o,q}$ are respectively the principal extraordinary refractive index and the principal ordinary refractive index for waveplate number q.

Again, the example above uses at least two plates to compensate for non-spatially uniform SOP but other applications like generation of arbitrary SOP may use from 1 to n plates manufactured as described above. In this case, the closed-form solution like described above can be either extended or replaced by an optimization algorithm.

Residual Spatial Phase Modulation

Fabrication tolerances and calculation errors may result in residual spatial phase. This should be measured in situ following the fabrication of the stack of birefringent plates with the actual polarization-transformed beam. Compensation could require an additional isotropic plate or could be combined with other wavefront correction methods for the input beam.

The foregoing description of the technology has been presented for purposes of illustration and description and is not intended to be exhaustive or to limit the technology to the precise form disclosed. Many modifications and variations am possible in light of the above teaching. The embodiments disclosed were meant only to explain the principles of the technology and its practical application to thereby enable others skilled in the art to best use the technology in various embodiments and with various modifications suited to the particular use contemplated. The scope of the technology is to be defined by the following claims.

We claim:

1. An apparatus, comprising:
a laser system configured to produce a laser beam having a fluence of at least 100 mJ/cm$^2$;
a polarimetry system configured to determine an input distribution of input states of polarization of an input electromagnetic radiation field that is associated with the laser beam in an input plane transverse to a beam path of said input electromagnetic radiation field; and
at least one birefringent plate positioned parallel to said input plane and transverse to said beam path, wherein said at least one birefringent plate comprises an eigen-axis orientation and a spatially-varying thickness based at least in part on the input distribution of input states of polarization and configured such that when said input electromagnetic radiation field having said input distribution and having a fluence of at least 100 mJ/cm$^2$ propagates onto said at least one birefringent plate, said at least one birefringent plate will transform said input distribution into a predetermined target output distribution of output states of polarization to output the laser beam with the predetermined target output distribution of output states of polarization;
wherein the at least one birefringent plate includes at least a birefringent plate q that has a spatially-varying thickness at points (x,y) that deviates from a thickness that would provide neutral retardation of an integer multiple of $2\pi$ by an amount $\Delta z_q(x,y)$ that is defined by the following equation:

$$\Delta z_q(x, y) = \frac{\lambda \delta_q(x, y)}{2\pi |n_{e,q} - n_{o,q}|}$$

wherein $n_{e,q}$ is a principal extraordinary refractive index and $n_{o,q}$ is a principal ordinary refractive index for the birefringent plate q, wherein $\lambda$ is a wavelength of the laser beam, and wherein $\delta_q(x,y)$ is the spatially-dependent phase difference between a fast axis and a slow axis at points (x,y) for the birefringent plate q, and wherein the spatially-varying thickness of the at least one birefringent plate produces spatially-dependent phase differences that transform the input distribution of input states of polarization into the predetermined target output distribution of output states of polarization.

2. The apparatus of claim 1, wherein the polarimetry system comprises an imaging polarimetry system positioned to determine said input states of polarization.

3. The apparatus of claim 1, wherein the laser system is configured to provide the laser beam at a fluence that is less than a damage threshold of a birefringent material forming said at least one birefringent plate.

4. The apparatus of claim 1, wherein said spatially-varying thickness is produced by a manufacturing technique that enables control of material removal at 5 nm RMS.

5. The apparatus of claim 1, wherein said spatially-varying thickness is produced by a magneto-rheological finishing (MRF) technique.

6. The apparatus of claim 1, wherein said at least one birefringent plate comprises a plurality of birefringent plates, wherein each of said plurality of birefringent plates comprises two neutral axes, wherein each birefringent plate is formed to have a pre-computed thickness normal to said input plane, wherein said thickness is configured to be a local polarization transformer element that locally varies the optical retardation between said two neutral axes of each birefringent plate.

7. The apparatus of claim 6, wherein each birefringent plate is made of a monolithic piece of birefringent material such that the eigen-axis orientation is the same across each birefringent plate.

8. The apparatus of claim 1, wherein the at least one birefringent plate is configured to transform said input distribution into the predetermined target output distribution of output states of polarization having substantially uniform polarization.

9. The apparatus of claim 1, wherein the at least one birefringent plate is positioned at a position where the polarimetry system is configured to determine the input distribution of input states of polarization of the input electromagnetic radiation field.

10. The apparatus of claim 1, wherein the at least one birefringent plate is positioned where the beam is collimated.

11. The apparatus of claim 1, wherein the laser system has a gain medium, wherein heat accumulation in the gain medium from operation of the laser system produces a polarization change in the laser beam; and wherein the at least one birefringent plate is configured to transform said input distribution into the predetermined target output distribution of output states of polarization to at least partially counter the polarization change caused by the heat accumulation in the gain medium.

12. A method, comprising:

producing a laser beam having a fluence of at least 100 mJ/cm² using a laser system;

determining, using a polarimetry system, an input distribution of input states of polarization of an input electromagnetic radiation field that is associated with the laser beam in an input plane transverse to a beam path of said input electromagnetic radiation field;

providing at least one birefringent plate positioned parallel to said input plane and transverse to said beam path, wherein said at least one birefringent plate has an eigen-axis orientation and a spatially-varying thickness based at least in part on the input distribution of input states of polarization and configured such that when said input electromagnetic radiation field having said input distribution propagates onto said at least one birefringent plate, said at least one birefringent plate will transform said input distribution into a predetermined target output distribution of output states of polarization; and locating said at least one birefringent plate in said beam path of said input electromagnetic radiation field having a fluence of at least 100 mJ/cm² to produce said predetermined output distribution of output states of polarization in an output plane transverse to said beam path to output the laser beam with the predetermined target output distribution of output states of polarization;

wherein the at least one birefringent plate includes at least a birefringent plate q that has a spatially-varying thickness at points (x,y) that deviates from a thickness that would provide neutral retardation of an integer multiple of 2π by an amount $\Delta z_q(x,y)$ that is defined by the following equation:

$$\Delta z_q(x, y) = \frac{\lambda \delta_q(x, y)}{2\pi |n_{e,q} - n_{o,q}|}$$

wherein $n_{e,q}$ is a principal extraordinary refractive index and $n_{o,q}$ is a principal ordinary refractive index for the birefringent plate q, wherein λ is a wavelength of the laser beam, and wherein $\delta_q(x,y)$ is the spatially-dependent phase difference between a fast axis and a slow axis at points (x,y) for the birefringent plate q, and wherein the spatially-varying thickness of the at least one birefringent plate produces spatially-dependent phase differences that transform the input distribution of input states of polarization into the predetermined target output distribution of output states of polarization.

13. The method of claim 12, wherein the step of determining comprises utilizing an imaging polarimetry method to determine said input states of polarization.

14. The method of claim 12, wherein said input electromagnetic radiation field comprises a fluence that is less than a damage threshold of a birefringent material forming said at least one birefringent plate.

15. The method of claim 12, wherein said spatially-varying thickness is produced by a manufacturing technique that enables control of material removal at 5 nm RMS.

16. The method of claim 12, wherein said spatially-varying thickness is produced by the magneto-rheological finishing (MRF) technique.

17. The method of claim 12, wherein said at least one birefringent plate comprises a plurality of birefringent plates, wherein each birefringent plate of said plurality of birefringent plates comprises two neutral axes, wherein each birefringent plate is formed to have a pre-computed thickness normal to said input plane, wherein said thickness acts as a local polarization transformer element by locally varying the optical retardation between said two neutral axes of each birefringent plate.

18. The method of claim 17, wherein each birefringent plate is made of a monolithic piece of a birefringent material such that said eigen-axis orientation is the same across each birefringent plate.

19. The method of claim 12, comprising transforming, using the at least one birefringent plate, said input distribution into the predetermined target output distribution of output states of polarization having substantially uniform polarization.

20. The method of claim 12, comprising locating the at least one birefringent plate at the position where the polarimetry system is configured to determine the input distribution of input states of polarization of the input electromagnetic radiation field.

21. The method of claim 12, wherein the at least one birefringent plate is positioned where the beam is collimated.

22. The method of claim 12, wherein the laser system has a gain medium, wherein heat accumulation in the gain medium from operation of the laser system produces a polarization change in the laser beam; and wherein locating the at least one birefringent plate in the beam path transforms said input distribution into the predetermined target output distribution of output states of polarization to at least partially counter the polarization change caused by the heat accumulation in the gain medium.

* * * * *